United States Patent
Huang et al.

(10) Patent No.: US 7,525,529 B2
(45) Date of Patent: Apr. 28, 2009

(54) DISPLAY PANEL AND RESCUE METHOD

(75) Inventors: Hsueh-Ying Huang, Sanchong (TW);
Min-Feng Chiang, Sinjhuang (TW)

(73) Assignee: AU Optronics Corp., Hsinchu (TW)

( * ) Notice: Subject to any disclaimer, the term of this patent is extended or adjusted under 35 U.S.C. 154(b) by 693 days.

(21) Appl. No.: 11/212,088

(22) Filed: Aug. 25, 2005

(65) Prior Publication Data

US 2006/0279524 A1   Dec. 14, 2006

(30) Foreign Application Priority Data

Jun. 8, 2005   (TW) .............................. 94118895 A

(51) Int. Cl.
*G09G 3/36* (2006.01)
(52) U.S. Cl. ............................ 345/93; 349/54; 349/192
(58) Field of Classification Search .................. 345/90, 345/93, 103, 204–206; 349/54, 192
See application file for complete search history.

(56) References Cited

U.S. PATENT DOCUMENTS

| | | | | |
|---|---|---|---|---|
| 5,408,252 | A * | 4/1995 | Oki et al. ..................... | 345/205 |
| 6,100,948 | A * | 8/2000 | Kim et al. ..................... | 349/39 |
| 6,313,889 | B1 * | 11/2001 | Song et al. ..................... | 349/54 |
| 6,888,589 | B2 * | 5/2005 | Kim et al. ..................... | 349/54 |
| 6,943,374 | B1 * | 9/2005 | Park ............................. | 257/72 |
| 7,187,423 | B2 * | 3/2007 | Ozaki et al. ..................... | 349/54 |
| 7,209,193 | B2 * | 4/2007 | Song et al. ..................... | 349/54 |
| 7,358,534 | B2 * | 4/2008 | Park ............................. | 257/72 |

FOREIGN PATENT DOCUMENTS

| | | | |
|---|---|---|---|
| CN | 1527268 | | 9/2004 |
| JP | 2001-109018 | * | 4/2001 |
| JP | 2001109018 | | 4/2001 |

OTHER PUBLICATIONS

CN Office Action mailed Apr. 6, 2007.

* cited by examiner

*Primary Examiner*—Richard Hjerpe
*Assistant Examiner*—Tom V Sheng
(74) *Attorney, Agent, or Firm*—Thomas, Kayden, Horstemeyer & Risley

(57) ABSTRACT

A display panel comprising a pixel array is provided. The pixel array, laid on a first circuit layer, comprises at least one first pixel, at least one second pixel, at least one rescue line, and an isolation layer. The first pixel comprises a thin film transistor aligned to upper edge of the first pixel. The second pixel comprises a thin film transistor aligned to lower edge of the second pixel, wherein the second pixel is adjacent to the first pixel and below the first pixel respectively. The rescue line lay on a second circuit layer, positions at the gap between the first pixel and the second pixel. The isolation layer lies between the first circuit layer and the second circuit layer.

17 Claims, 5 Drawing Sheets

DISPLAY PANEL AND RESCUE METHOD

BACKGROUND

The invention relates to rescue line architecture in a display panel, and in particular, to rescue lines lying on the gap between two kinds of pixels.

FIG. 1a shows a conventional display panel. A source controller 104 is disposed above the pixel array 108, coupling to the pixel array 108 via a FPC 112. A gate controller 106 is disposed to the left of the pixel array 108, coupling to the pixel array 108 via a flexible printed circuit (FPC) 112. The source controller 104 drives corresponding pixels in the pixel array 108 via the plurality of source line 110. The display panel also comprises at least one rescue line 102, the rescue line 102 comprises a head end horizontally crossing the upper edge of pixel array 108, intersecting the source line 110 (not contacted), and a tail end passing through the FPC 112, the source controller 104, the amplifier 114, the pixel array 108, the FPC 112, the gate controller 106 and the lower edge of pixel array 108, again intersect with the plurality of source lines 110 without contact. FIG. 1b is a perspective drawing of the conventional display panel in FIG. 1a. The display panel comprises an isolation layer 107 between a first circuit layer 103 and a second circuit layer 105. The rescue line 102 is laid on the first circuit layer 103, and the plurality of source lines 110 are laid on second circuit layer 105, thus there is typically no contact therebetween.

When manufacturing the display panels, source line 110 are occasionally broken. The rescue line 102 is therefore coupled by contacting the intersection point with the corresponding source line 110 to maintain the circuit. The rescue line 102 can only be laid on the edge of the pixel array 108 because pixels in the pixel array 108 are tightly arranged, leaving insufficient room for rescue line layout. Thus, if the display panel is a double sided driving architecture, no room is left for rescue line 102 layouts.

SUMMARY

An embodiment of the invention provides a display panel, comprising a pixel array, at least one first row, at least one second row, at least one rescue line, and an isolation layer. The pixel array, laid on a first circuit layer, comprises at least one first row comprising a plurality of first pixels arranged horizontally. Each first pixel comprises a thin film transistor aligned to the upper edge of the first pixel. The second row comprises a plurality of second pixels arranged horizontally. Each second pixel comprises a thin film transistor aligned to lower edge of the second pixel. The second row is adjacent to the first row and below the first row respectively. The rescue line lay on a second circuit layer, positioned at the gap between the first row and the second row. The isolation layer lies between the first circuit layer and the second circuit layer.

The pixel array may be divided into an upper part and a lower part. The first row may be the lowest row in the upper part and the second row may be the topmost row in the lower part.

The display panel may further comprises at least one upper source controller one, lower source controller one, left gate controller and one right gate controller. The upper source controller, disposed the upside of the pixel array, comprises a plurality of upper source lines vertically arranged for driving the upper part, wherein each upper source line comprises a head coupled to the upper source controller, and a tail coupled to the first row. The lower source controller, disposed the downside of the pixel array, comprises a plurality of lower source lines vertically arranged for driving the lower part, wherein each lower source line comprises a head coupled to the lower source controller, and a tail coupled to the second row. The left gate controller, disposed on the left side of the pixel array, drives a portion of the upper part and the lower part. The right gate controller, disposed on the right side of the pixel array, drives a portion of the upper part and the lower part.

The display panel may further comprise a plurality of flexible printed circuits (FPC), carrying the rescue lines that respectively couple the upper source controller, the lower source controller, the left gate controller and the right gate controller to the pixel array. Both the upper source controller and the lower source controller may comprise at least one amplifier cascaded with a corresponding rescue line.

The rescue line may comprise a first rescue line, a second rescue line, a third rescue line and a fourth rescue line.

The first rescue line may comprise one end crossing the heads of the upper source lines, and another end passing through the upper source controller, the left gate controller, and the gap between the upper part and the lower part, for rescue of the upper left part when needed.

The second rescue line may comprise one end crossing the heads of the upper source lines, and another end passing through the upper source controller, the right gate controller, and the gap between the upper part and the lower part, for rescue of the upper right part when needed.

The third rescue line may comprise one end crossing the heads of the lower source lines, and another end passing through the lower source controller, the left gate controller, and the gap between the lower part and the upper part, for rescue of the lower left part when needed.

The fourth rescue line may comprise one end crossing the heads of the lower source lines, and another end passing through the lower source controller, the right gate controller, and the gap between the lower part and the upper part, for rescue of the lower right part when needed.

All pixels in the upper part may be the first pixels, and all pixels in the lower part may be the second pixels. All pixels in the upper part may be the third pixels except the first row, and all pixels in the lower part may be the third pixels except the second row.

Another embodiment of the invention provides a rescue method for the display panel of the previously described embodiment.

A further embodiment provides a display panel, comprising a pixel array. The pixel array, laid on a first circuit layer, comprises at least one first pixel, at least one second pixel, at least one rescue line, and an isolation layer. The first pixel comprises a thin film transistor aligned to an upper edge of the first pixel. The second pixel comprises a thin film transistor aligned to a lower edge of the second pixel, wherein the second pixel is adjacent to the first pixel and below the first pixel respectively. The rescue line lay on a second circuit layer, positioned at the gap between the first pixel and the second pixel. The isolation layer lies between the first circuit layer and the second circuit layer.

BRIEF DESCRIPTION

The following detailed description, given by way of example and not intended to limit the invention solely to the embodiments described herein, will best be understood in conjunction with the accompanying drawings, in which.

DETAILED DESCRIPTION OF THE INVENTION

A detailed description of the invention is provided in the following.

A typical pixel circuit comprises one thin film transistor (TFT), coupled to a source line and a gate line to receive data and control signals. The thin film transistor generally aligns to either the upper edge or the lower edge of the pixel circuit. If two pixel circuits are combined, with the upper one having the thin film transistor aligned upwards, and the lower one having the thin film transistor aligned downwards, the gap produced therebetween may be sufficient for rescue line layouts.

Figure 2:
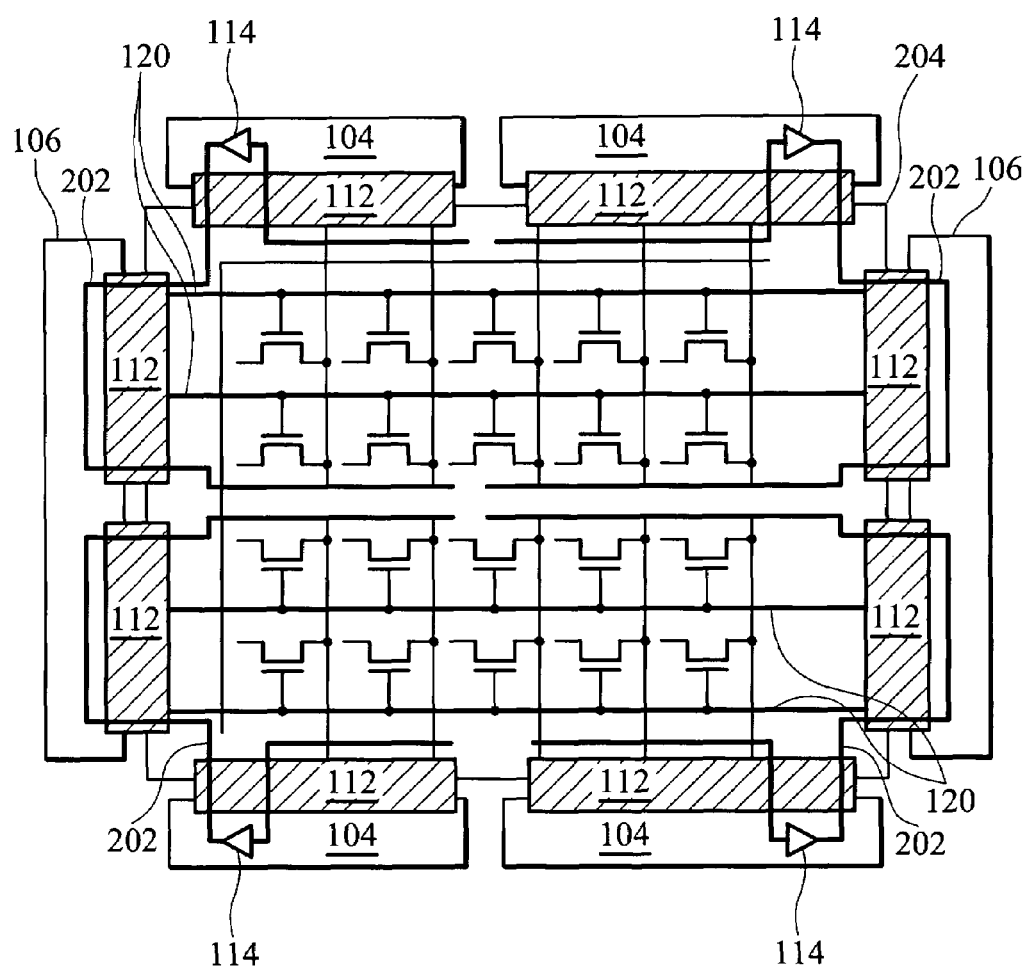
FIG. 2 shows an embodiment of the display according to the invention.

FIG. 2 shows an embodiment of the display panel according to the invention. Pixel array 204 is double side driven. The upper part and lower part of the pixel array 204 are driven by corresponding source controllers 104, and the gate controllers 106 at both sides provide control of left and right parts of the pixel array 204. Alternately, a gate line 120 may be selectively driven by one or both gate controllers 106 if either end is coupled to the gate controller 106. The pixel array 204 is therefore subsequently divided into four parts. As shown in FIG. 2, in the upper part of pixel array 204, the thin film transistor in the pixels are up aligned, and the gate therein is coupled to an adjacent upward gate line 120. Conversely, the thin film transistor in the lower part pixels is down aligned, and the gate thereof is coupled to an adjacent downward gate line 120. As a result, a gap, sufficient for rescue line 202, is formed between the up aligned pixel row and the down aligned pixel row.

Figure 1A:
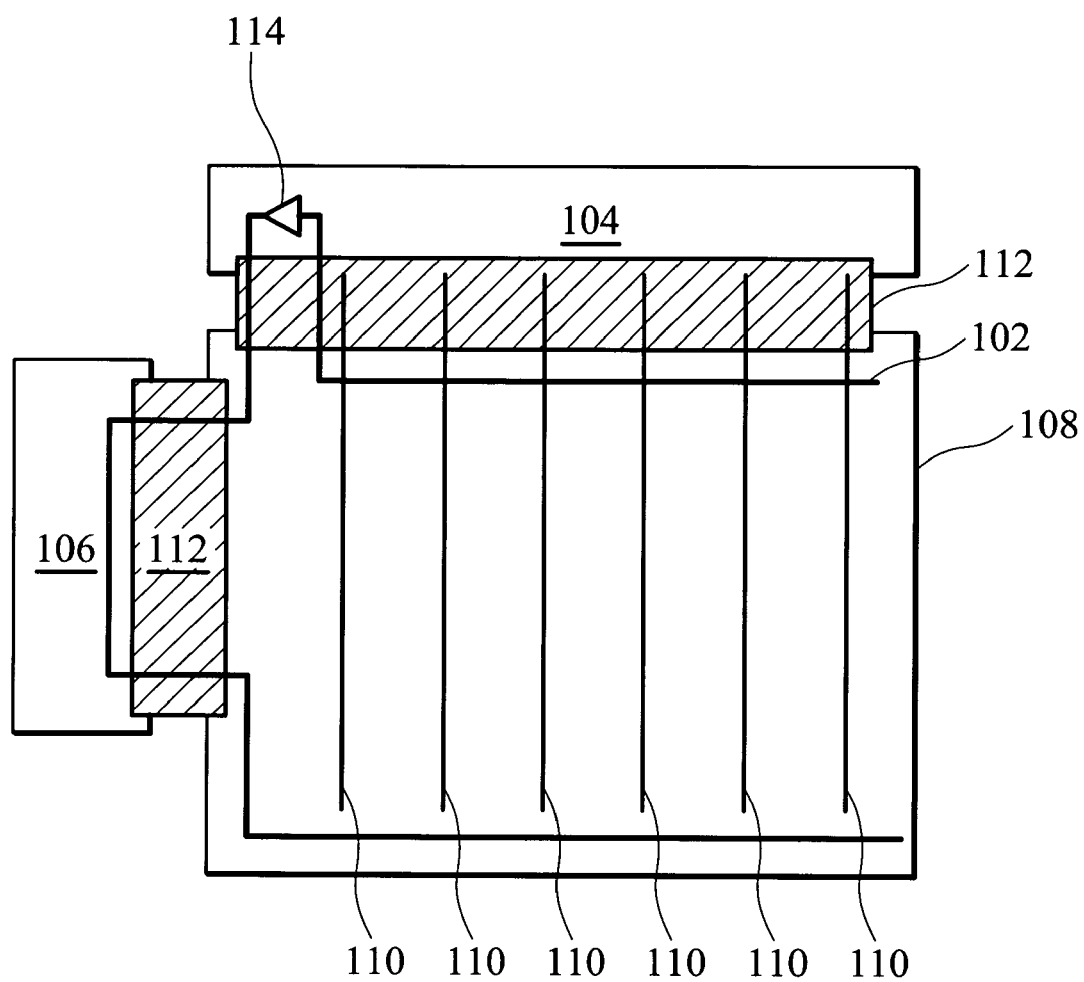
FIG. 1a shows a conventional display panel.
Figure 1B:
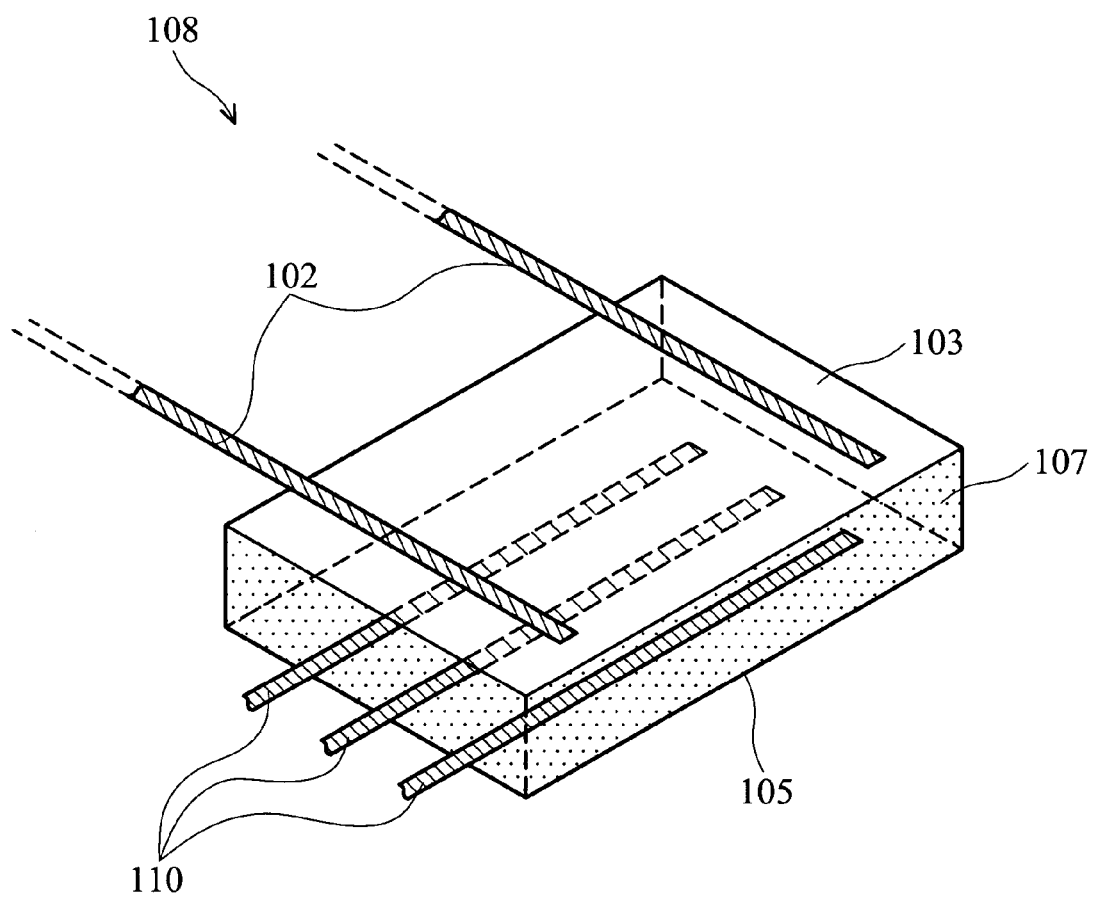
FIG. 1b is a perspective drawing of the conventional display panel.

In this case, four rescue lines 202 are horizontally provided for rescue of upper left, upper right, lower left, lower right parts of the pixel array 204. Since the rescue lines 202 and source lines 110 are laid on different layers as shown in FIG. 1b, the head end of rescue line 202 intersects, without contacting the plurality of source lines 110. An amplifier 114 is provided in the source controller 104 to perform signal amplification for the rescue line 202. The tail end of the rescue line 202 then vertically extends through the gate controller 106 and FPC 112 to the gap between the upper part and the lower part of the pixel array 204. A display panel is tested before being sent to a vendor. If any of the line source lines 110 is broken, a rescue process is performed. The rescue line 202 is substitutes for the broken source line 110 by contacting the corresponding intersection point therebetween, such that the data bound to the pixels can be normally transmitted through the rescue line 202 instead of the broken source line 110.

In this case, the pixel array 204 is divided into four parts, and four rescue lines 202 are provided. The architecture, however, is also applicable for conventional single side driven display panels, and the number of rescue line 202 can vary depending on the gap width.

Figure 3:
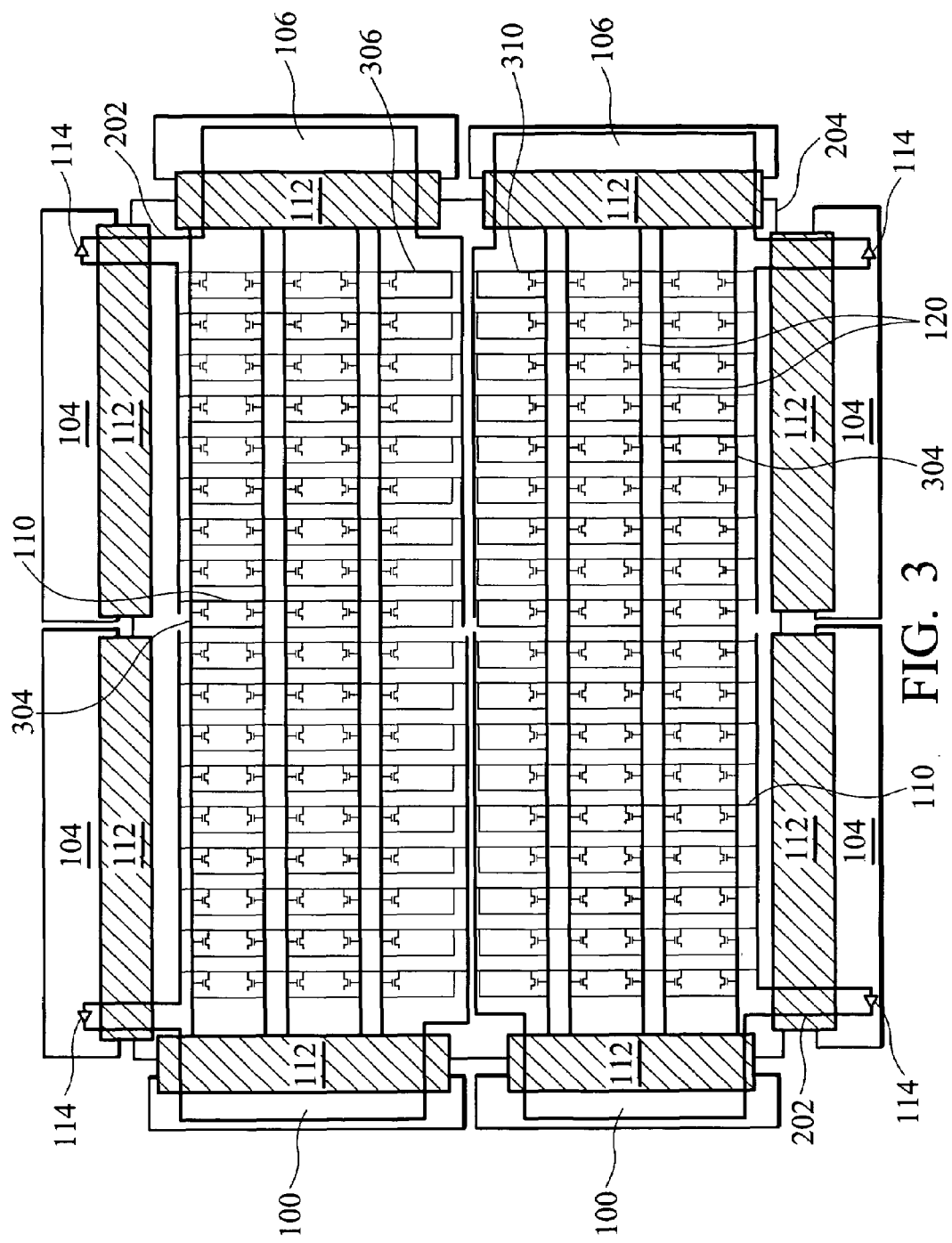
FIG. 3 shows another embodiment of the display according to the invention.

FIG. 3 shows another embodiment of a display panel according to the invention. The display panel comprises a plurality of double gate pixels 304. Each double gate pixel 304 comprises two thin film transistors, aligning to either side in the double gate pixel 304. Each thin film transistor is coupled to a corresponding gate line 120 and source line 110. A double gate pixel 304 can be controlled by one or both the left and right FPC 112, depending on the coupling of gate line 120. In FIG. 3, pixels in a lowest row of the upper part are up gate pixels 306, and pixels in a topmost row of the lower part, are down gate pixels 310. The up gate pixel 306 comprises only one upward aligned thin film transistor, and the down gate pixel 310 comprises only one downward aligned thin film transistor. Only one gate line is required to drive the up gate pixel 306 and down gate pixel 310 and additional room is spared at the no gate line side to form the gap between the up gate pixel 306 rows and the down gate pixel 310 row. Since the number of thin film transistors varies between the up gate pixel 306, down gate pixel 310 and double gate pixel 304, the thin film transistor areas thereof, are carefully designed to provide for light emission uniformity. The gap is then utilized to layout the horizontal portion of the rescue line 202.

Figure 4:
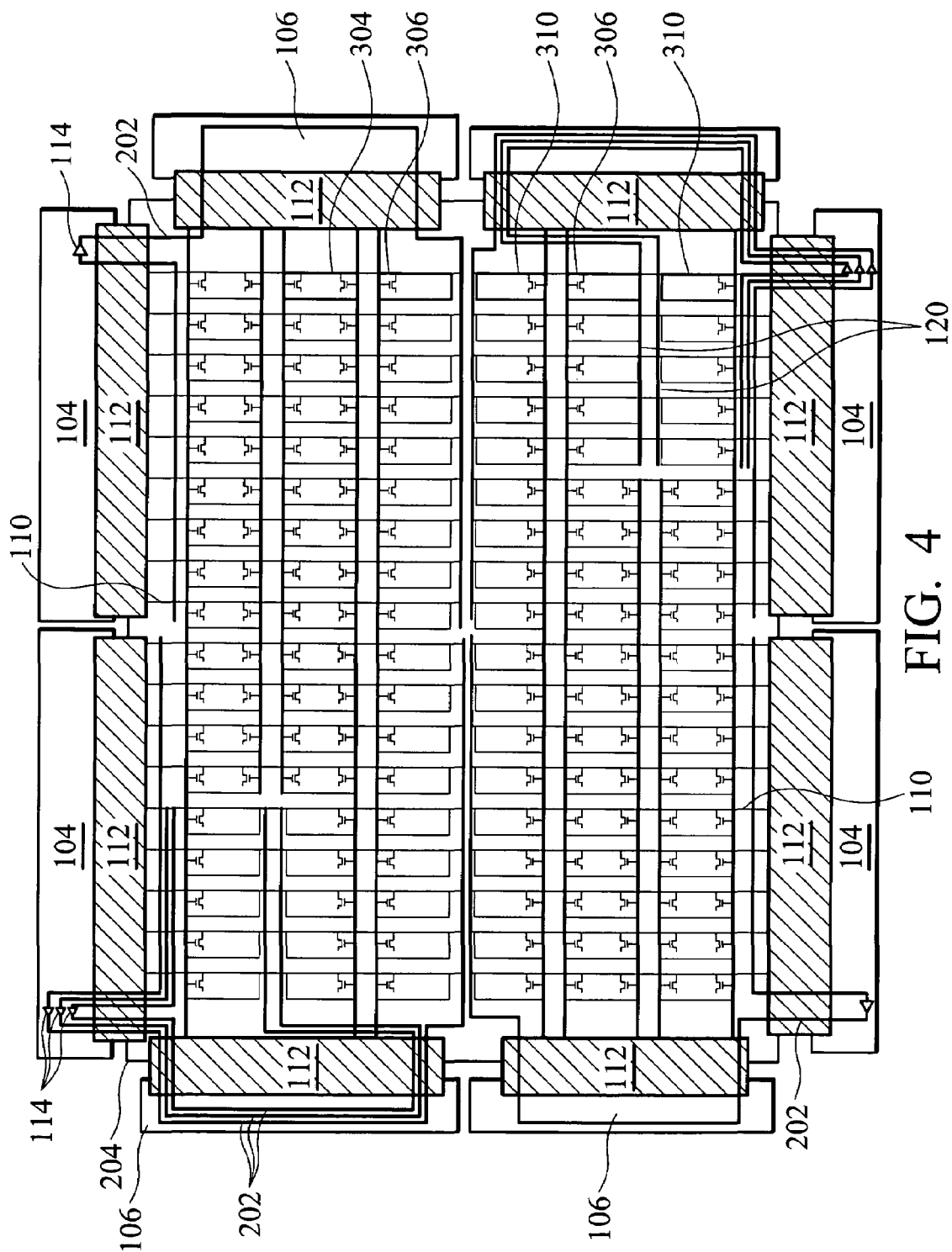
FIG. 4 shows a further embodiment of the display according to the invention.

FIG. 4 shows a further embodiment of the display according to the invention. Various configurations of the up gate pixel 306 and down gate pixel 310 line pairs are provided in addition to the first and second rows in FIG. 3. Thus a plurality of rescue lines 202 can be placed in the corresponding gaps. The length of line pairs may vary to allow different rescue ranges. For example, some source line 110 may intersect with more than one rescue line, and if the source line 110 has more than one break point, rescue can still be performed. The architecture is also applicable for conventional single side driven display panel. When a broken source line 110 is located, contact is made with the corresponding rescue line 202 by a conventional welding process, thus a substitute path for the pixels corresponding to the broken source line 110 can be formed.

Furthermore, a rescue line may be two wires of different metals cascaded in line. For example, a conventional bottom gate process, disposes the gate lines at a first layer while the gate lines are a first metal, and the source lines of a second metal at a second layer. The rescue lines within a display region, are horizontally disposed in parallel with the gate lines, both composed by the first metal. Conversely, the rescue lines outside the display region intercrossing the gate lines, made of the second metal, are disposed at the first layer, same with where the source lines distribute. The junctions where the first and second metal of a rescue line contact, are coupled by a pass through hole.

Based on the described display panel, a rescue method, comprising the following steps, can be performed. First, the source lines in the pixel array are examined to determine a broken source line. When the broken source line is located, the rescue line and the source line are then coupled by contacting their intersection point. Contact is also made between the rescue line and the source controller, such that the pixels corresponding to the broken line receives data via the rescue line. The determination can be a conventional process, and the coupling method can be a conventional welding process.

While the invention has been described by way of example and in terms of the preferred embodiment, it is to be understood that the invention is not limited thereto. To the contrary, it is intended to cover various modifications and similar rows (as would be apparent to those skilled in the art). Therefore, the scope of the appended claims should be accorded the broadest interpretation so as to encompass all such modifications and similar rows.

What is claimed is:

1. A display panel, comprising:
   a pixel array, comprising:
      at least one first row, comprising a plurality of first pixels arranged horizontally, wherein each first pixel comprises a thin film transistor aligned to an upper edge of the first pixel; and
      at least one second row, comprising a plurality of second pixels arranged horizontally, wherein each second pixel comprises a thin film transistor aligned to a lower edge of the second pixel, wherein the second row is adjacent to the first row and below the first row respectively;

a source controller controlling a plurality of source lines, wherein each source line is corresponding to a vertical line in the pixel array; and at least one rescue line, positioned at the gap between the first row and the second row, crossing the source lines and isolated from the source lines by an isolation layer; wherein when a source line is determined as a broken line, the rescue line is contacted to the broken line at their intersection point, and coupled to the source controller to conduct data to pixels corresponding to the broken line.

2. The display panel as claimed in claim 1, wherein the source lines and the horizontal rescue lines are disposing at different layers.

3. The display panel as claimed in claim 1, further comprising a plurality of gate lines, each corresponding to a horizontal line in the display panel, isolated from the source lines with the isolation layer at their intercross region.

4. The display panel as claimed in claim 3, wherein the gate lines and the vertical rescue lines are at different layers.

5. The display panel as claimed in claim 1, wherein:
the pixel array is divided into an upper part and a lower part;
the first row is the lowest row in the upper part; and
the second row is the topmost row in the lower part.

6. The display panel as claimed in claim 5, wherein:
the source controller comprises:
at least one upper source controller, disposed on the upside of the pixel array, comprising a plurality of upper source lines vertically arranged for driving the upper part, wherein each upper source line comprises a head coupled to the upper source controller, and a tail coupled to the first row;
at least one lower source controller, disposed on the downside of the pixel array, comprising a plurality of lower source lines vertically arranged for driving the lower part, wherein each lower source line comprises a head coupled to the lower source controller, and a tail coupled to the second row; and the gate controller comprises:
at least one left gate controller, disposed on the left-side of the pixel array, driving a portion of the upper part and the lower part; and
at least one right gate controller, disposed on the right-side of the pixel array, driving a portion of the upper part and the lower part.

7. The display panel as claimed in claim 6, further comprising a plurality of flexible printed circuits (FPC), carrying the rescue lines that respectively couple the upper source controller, the lower source controller, the left gate controller and the right gate controller to the pixel array.

8. The display panel as claimed in claim 7, wherein each upper source controller and lower source controller comprises at least one amplifier cascaded with a corresponding rescue line.

9. The display panel as claimed in claim 8, wherein the at least one rescue line comprises:
a first rescue line, comprising one end crossing the heads of the upper source lines, and another end passing through the upper source controller, the left gate controller, and the gap between the upper part and the lower part, for rescue of the upper left part when needed;
a second rescue line, comprising one end crossing the heads of the upper source lines, and another end passing through the upper source controller, the right gate controller, and the gap between the upper part and the lower part, for rescue of the upper right part when needed;
a third rescue line, comprising one end crossing the heads of the lower source lines, and another end passing through the lower source controller, the left gate controller, and the gap between the lower part and the upper part, for rescue of the lower left part when needed; and
a fourth rescue line, comprising one end crossing the heads of the lower source lines, and another end passing through the lower source controller, the right gate controller, and the gap between the lower part and the upper part, for rescue of the lower right part when needed.

10. The display panel as claimed in claim 9, wherein:
all pixels in the upper part are the first pixels; and
all pixels in the lower part are the second pixels.

11. The display panel as claimed in claim 9, wherein:
the pixel array further comprises a plurality of third pixels, wherein each third pixel comprises two thin film transistors, one aligned to an upper edge of the third pixel, and another aligned to a lower edge of the third pixel;
all pixels in the upper part are the third pixels except the first row; and
all pixels in the lower part are the third pixels except the second row.

12. The display panel as claimed in claim 8, wherein:
the pixel array further comprises a plurality of third pixels, wherein each third pixel comprises two thin film transistors, one aligned to upper edge of the third pixel, and another aligned to lower edge of the third pixel;
the first row further comprises:
a plurality of successive first pixels and successive third pixels horizontally arranged;
a first gate line, cascading the upper edges of the first and third pixels in the first row; and
a second gate line, cascading the lower edges of the third pixels in the first row;
the second row further comprises:
a plurality of successive second pixels and successive third pixels horizontally arranged;
a third gate line, cascading from the lower edges of the first and third pixels in the first row; and
a fourth gate line, cascading from the upper edges of the third pixels in the first row;
the at least one rescue line comprises:
a first rescue line, laid on the lower edge of the first pixels in the first row; and
a second rescue line, laid on the upper edge of the second pixels in the second row.

13. A rescue method for a display panel, wherein the display panel comprises:
a pixel array, laid on a first circuit layer, comprising:
at least one first row, comprising a plurality of first pixels arranged horizontally, wherein each first pixel comprises a thin film transistor aligned to upper edge of the first pixel; and
at least one second row, comprising a plurality of second pixels arranged horizontally, wherein each second pixel comprises a thin film transistor aligned to lower edge of the second pixel, wherein the second row is adjacent to the first row and below the first row respectively;
at least one source controller providing data via a plurality of source lines each corresponds to a corresponding vertical line in the pixel array;

at least one rescue line, laid on a second circuit layer, positioned at the gap between the first row and the second row; and an isolation layer lay between the first circuit layer and the second circuit layer;

the rescue method comprises:

examining the source lines in the pixel array to determine a broken source line;

when the broken source line is determined, coupling the rescue line and the source line by contacting their intersection point; and coupling the rescue line and the source controller, such that the pixels corresponding to the broken line receives data via the rescue line.

14. A display panel, comprising:

a pixel array, laid on a first circuit layer, comprising:

at least one first pixel, comprising a thin film transistor aligned to upper edge of the first pixel; and at least one second pixel, comprising a thin film transistor aligned to lower edge of the second pixel, wherein the second pixel is adjacent to the first pixel and below the first pixel respectively;

at least one rescue line, laid on a second circuit layer, positioned at the gap between the first pixel and the second pixel;

an isolation layer lay between the first circuit layer and the second circuit layers; and a source controller comprising a plurality of source lines, each source line corresponding to a vertical line in the pixel array and isolated from the rescue lines by the isolation layer; wherein when one of the source lines is determined as a broken line, the rescue line connects the broken line to the source controller to conduct data to pixels corresponding to the broken line.

15. The display panel as claimed in claim 14, wherein the source lines and the horizontal rescue lines are disposing at different layers.

16. The display panel as claimed in claim 14, further comprising a plurality of gate lines, each corresponding to a horizontal line in the display panel, isolated from the source lines with the isolation layer at their intercross region.

17. The display panel as claimed in claim 16, wherein the gate lines and the vertical rescue lines are at different layers.

* * * * *